United States Patent [19]

Nishizawa

[11] 4,030,820
[45] June 21, 1977

[54] AUTOMATIC FADING DEVICE FOR MOTION PICTURE CAMERA

[75] Inventor: Tetsuo Nishizawa, Kawagoe, Japan

[73] Assignee: Fuji Photo Optical Co., Ltd., Omiya, Japan

[22] Filed: Dec. 5, 1975

[21] Appl. No.: 638,195

[30] Foreign Application Priority Data
Dec. 9, 1974 Japan .................... 49-147977[U]

[52] U.S. Cl. .......................... 352/91 C; 352/170; 352/217
[51] Int. Cl.² ....................................... G03B 21/36
[58] Field of Search ............. 352/91 R, 91 C, 91 S, 352/217, 170

[56] References Cited
UNITED STATES PATENTS 3,549,249 12/1970 Katsuyama ..................... 352/91 S
3,748,029 7/1973 Sakaguchi ...................... 352/91 S Primary Examiner—Monroe H. Hayes

[57] ABSTRACT

A fading device for a motion picture camera includes a pair of sectors rotated with respect to each other to vary the angle of a light passing section formed thereby to obtain a fade-in or fade-out effect. The sectors are rotated relatively to each other by means of a drive mechanism operated by a motor by way of a change-over mechanism which is operable to change the direction of the relative rotation of the sectors. An indicator is connected with the change-over mechanism to indicate whether the fade-in or fade-out is possible in accordance with the situation of the sectors.

3 Claims, 3 Drawing Figures

AUTOMATIC FADING DEVICE FOR MOTION PICTURE CAMERA

BACKGROUND OF THE INVENTION

1. Field of the Invention

This invention relates to an automatic fading device for a motion picture camera, and more particularly to a fading device which is capable of indicating whether the device is operable to fade in or fade out.

2. Description of the Prior Art

Automatic fading devices which are provided in motion picture cameras to fade out or in have been known in the art. These conventional devices have a defect in that it is unknown to the operator whether the devices are operable to fade in or fade out, or in the fade-in operation or fade-out operation. Therefore, the operator must rely upon his memorization during his operation to know if the device is operable to fade in or out.

SUMMARY OF THE INVENTION

In view of the above described defect inherent in the conventional automatic fading device, it is the primary object of the present invention to provide an automatic fading device which indicates whether the device is operable to fade in or fade out.

Another object of the present invention is to provide an automatic fading device which is capable of automatically fading in or fading out by use of an electric motor and of overlapping the fade-in and fade-out.

The fading device in accordance with the present invention is provided with an indicator which indicates that the device is operable to fade in or fade out. The indicator is connected with an automatic fading means including a fader consisting of a pair of sectors provided in the optical path of a motion picture camera and a motor-driven gear mechanism for driving the fader. The indicator indicates that the fade in operation is possible when the sectors are closed and that the fade out operation is possible when the sectors are opened.

DESCRIPTION OF THE PREFERRED EMBODIMENT

Figure 1:
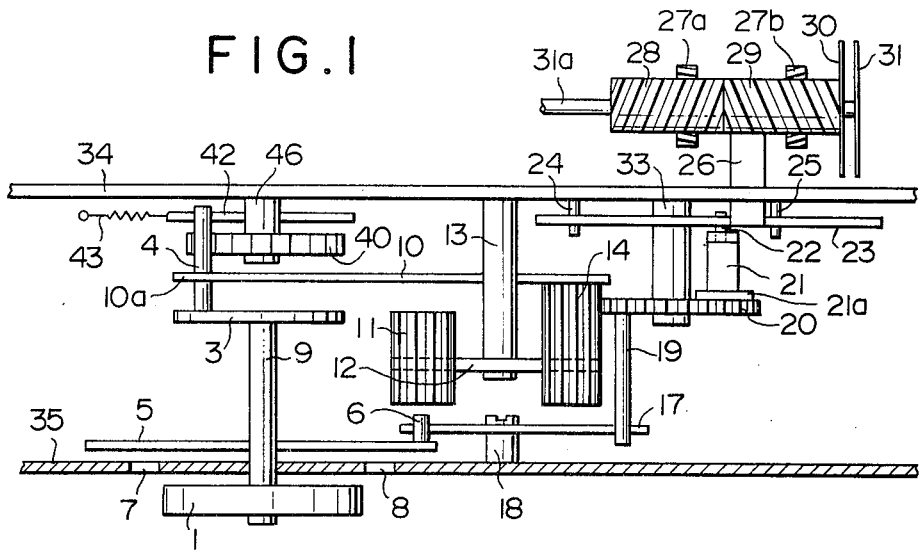
FIG. 1 is a schematic plan view showing the main portion of the fading device in accordance with the present invention.
Figure 2:
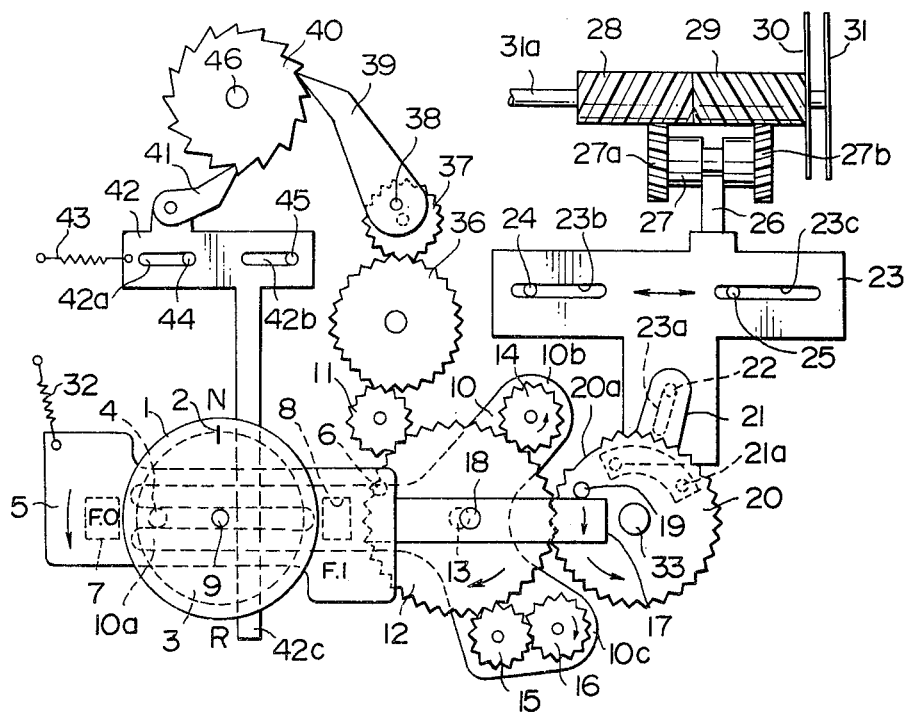
FIG. 2 is a side view of the same.

Referring to FIGS. 1 and 2 which show a preferred embodiment of the present invention, a fader comprises a pair of rotary sectors 30 and 31. One sector 31 is fixed to a drive shaft 31a which is rotated at a high speed by a shutter mechanism. A screw gear 28 is fixed to the drive shaft 31a and is meshed with another screw gear 27a fixed to a gear shaft 27. The other sector 30 is fixed to a screw gear 29 which is rotatably mounted on said drive shaft 31a and is meshed with another screw gear 27b which is also fixed to said gear shaft 27, so that the four screw gears 27a, 27b, 28 and 29 are rotated all together. The sectors 30 and 31 form a fan-shaped light passing section in the optical path of the motion picture camera and the angle of the section is changed by rotating one sector with respect to the other. Said gear shaft 27 to which said screw gears 27a and 27b are fixed is movable along the direction of the drive shaft 31a to vary the angle of the section by rotating the screw gears 28 and 29 in the opposite directions. The gear shaft 27 is engaged with a slide pin 26 which is mounted to a slide plate 23. Therefore, by sliding the slide plate 23 back and forth, the angle of the section formed by the pair of sectors 30 and 31 is varied from zero (fully closed) to a predetermined angle (fully opened) while the sectors 30 and 31 are rotated at a high speed in the same direction to intermittently expose a film in the camera as is well known in the art of motion picture cameras. In the embodiment shown in FIGS. 1 and 2, the angle of the section increases as the slide plate 23 moves to the right and vice versa.

A fade dial 1 is fixed to a shaft 9 which is rotatably mounted to a casing 35 of the motion picture camera so that the dial 1 may be operable from outside. Within the casing 35 of the camera, a disc 3 is fixed to the internal end of the rotatable shaft 9 so that the disc 3 is rotated together with the dial 1. The fade dial 1 is provided with a mark 2 which indicates the position of the dial 1 in cooperation with indices "F.O" and "F.I" are indicative of the situation of the fading device which appear selectively through windows 7 and 8 and indicate that the section is fully opened or closed.

The disc 3 has a pin 4 fixed thereto which pin is engaged with a fork portion 10a of a Y-shaped change-over lever 10 which is rotatably mounted to a shaft 13 fixed to a support plate 34 in the camera. The Y-shaped change-over lever 10 is rotated about the shaft 13 by the pin 4 when the dial 3 is turned. The change-over lever 10 has two arms 10b and 10c on which are rotatably provided gears 14 and 16, respectively. The gear 14 is directly meshed with a gear 12 which is rotatably mounted to said shaft 13. The gear 16 is meshed with an idle gear 15 which is also rotatably mounted on the arm 10c and is meshed with the gear 12. Thus, the gears 14 and 16 are rotated in the opposite directions by the rotation of the gear 12. The gear 12 is meshed with a drive gear 11 which is driven by an electric motor (not shown) and rotated thereby counterclockwise at a slow speed.

A fade gear 20 is rotatably mounted on a shaft 33 fixed to the support plate 34. The fade gear 20 is provided with a flat portion 20a on the periphery thereof and has a drive arm 21 fixed thereto. The drive arm 21 has a pin 22 fixed thereto and the base portion 21a thereof is directly fixed to the fade gear 20. When the change-over lever 10 is in the neutral position as shown in FIGS. 1 and 2, the fade gear 20 is not meshed with either the gear 14 nor the gear 16. When the change-over lever 10 is rotated clockwise or counterclockwise from the neutral position, the gear 14 or the gear 16 is brought into engagement with the gear 20 to rotate the gear 20 clockwise or counterclockwise.

A pair of guide pins 24 and 25 are fixed to the support plate 34 and slidably engaged with guide slots 23b and 23c formed in the slide plate 23 to guide the plate 23 back and forth in the horizontal direction in FIG. 2. The slide plate 23 further has a slot 23a which is slidably engaged with the pin 22 of said drive arm 21. When the fade gear 20 is rotated clockwise or counterclockwise, the slide plate 23 is slid to the right or left by the pin 22.

In accordance with a feature of the present invention, an indicator board 5 carrying the characters of "F.O" and "F.I" is rotatably mounted to the shaft 9 and is spring urged in the clockwise direction by means of a tension spring 32. The indicator board 5 has a pin 6 fixed thereto which is engaged with an end of a lever 17 which is in turn rotatably mounted to a shaft 18 fixed to the casing 35. The other end of the lever 17 is engaged with a pin 19 fixed to the fade gear 20 so that the indicator board 5 may be rotated counterclockwise when the fade gear 20 is rotated counterclockwise from the position as shown in FIG. 2 overcoming the tension of the spring 32.

The indicator board 5 is provided with the index "F.O" at a position to be registered with the window 7 and the index "F.I" at a position to be registered with the other window 8. At the position as shown in FIG. 2, the index "F.O" appears through the window 7. When the indicator board 5 is rotated counterclockwise by the counterclockwise rotation of the fade gear 20, the index "F.O" disappears and the other index "F.I" appears through the other window 8.

When the fade gear 20 is in the position as shown in FIG. 2 wherein the flat portion 20a thereof is faced to the gear 14, the slide plate 23 is in the right side position to fully open the sectors 30 and 31 and the indicator board 5 is in the position to make the index "F.O" appear through the window 7 indicating thereby that a fade-out operation is possible.

The gear 11 is meshed with a gear 36 which is in turn meshed with another gear 37. The gear 37 has an eccentric pin 38 on which a feed claw 39 is rotatably mounted. The feed claw 39 is engaged with a ratchet wheel 40 being spring-urged to be engaged therewith by a spring not shown in the drawing so that the feed claw 39 will advance the ratchet wheel 40 as the gear 37 rotates.

A pair of guide pins 44 and 45 are fixed to the support plate 34 and a drive motor change-over plate 42 having guide slots 42a and 42b engaged with the guide pins 44 and 45 is guided to move back and forth. The drive motor change-over plate 42 is normally spring-urged to the left by a tension spring 43. The plate 42 has an elongated arm 42c extending at right angles with respect to the direction of movement of the plate 42 across the circular locus of the pin 4 fixed to the disc 3, so that the arm 42c is moved to the right only when the fade dial 1 is in the position at which the mark 2 thereof indicates the index "R". The change-over plate 42 has a stopper 41 pivotally mounted thereto. The stopper 41 is spring-urged to be in engagement with the ratchet wheel 40 by means of a spring not shown in the drawing to prevent the clockwise rotation of the ratchet wheel 40. In response to the rightward movement of the change-over plate 42, the stopper 41 makes the ratchet wheel 40 rotate counterclockwise by a small angle.

Figure 3:
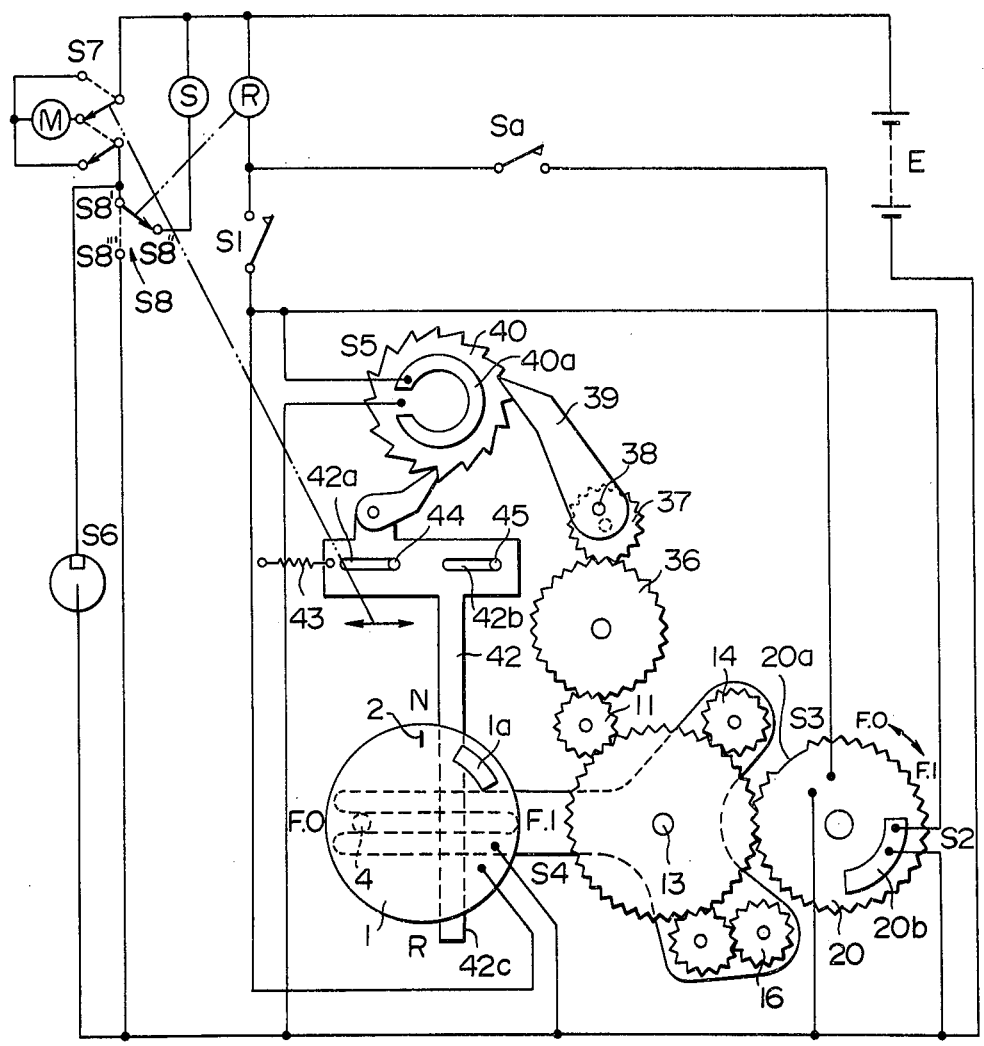
FIG. 3 is a diagram showing an electric circuit employed in connection with the fading device in accordance with the present invention.

Referring to FIG. 3 which shows an electric circuit for operating the fading device, a drive motor M is connected with a power source E by way of a change-over switch S7 which is connected with said change-over plate 42. When the plate 42 is in the left side position as shown in FIG. 3, the change-over switch S7 serves to rotate the motor M forward. When the plate 42 is in the right position, the change-over switch S7 serves to rotate the motor rearward. Between the cathode side of the power source E and the change-over switch S7, are provided a movable contact S8' and a first fixed contact S8' of a switch S8. A second fixed contact S8" of the switch S8 is provided between the movable contact S8' and a solenoid S which is connected with the anode side of the power source E. The movable contact S8' is operatively connected with a relay R so that the movable contact S8' will contact the first fixed contact S8''' when the relay R is energized and contact the second fixed contact S8" when the relay R is deenergized. In parallel with the switch S8 is connected a sector shaft position regulating switch S6. One end of the relay R is connected with the anode side of the power supply E and the other end of the relay R is connected with the cathode side of the power supply E by way of a main switch S1 which is operatively connected with a shutter release button and a switch S4. The switch S4 is closed when a contact member 1a fixed to the dial 1 is brought into contact with the switch S4 by the rotation of the dial 1 and is opened when the contact member 1a is moved away therefrom.

Furthermore, another switch S2 is connected between the cathode side of the power source E and the main switch S1. The switch S2 is closed when a contact member 20b fixed to the fade gear 20 falls into contact therewith and is opened when the contact member 20b is moved away therefrom. Similarly, between the relay R and the cathode side of the power source E are connected still another switch S3 and a sector closing switch S9 in series. The switch S3 is closed only when said contact member 20b of the fade gear 20 falls into contact therewith and is opened when the contact member 20b is moved away therefrom.

Further, between the main switch S1 and the cathode side of the power source E is connected a switch S5 which is closed when a contact member 40a fixed to the ratchet wheel 40 is brought into contact therewith and is opened when the contact member 40a is moved away therefrom.

Now the operation of the fading device in accordance with a preferred embodiment of the present invention will be described in detail.

The description of the operation thereof will start from the state as shown in FIGS. 2 and 3 wherein the mark 2 of the fade dial 1 indicates the index "N" and the sectors 30 and 31 are fully opened with the fade gear 20 rotated counterclockwise and the switch S2 is closed with other switches S3, S4 and S5 opened.

Since the pin 4 of the fade dial 1 is in the left side position, the change-over lever 10 is in the neutral position and the gears 14 and 16 are both separated from the fade gear 20.

When the main switch S1 is closed to start the operation of the camera, the relay R is energized since the switch S2 is closed and accordingly the movable contact S8' of the switch S8 is moved to the first fixed contact S8'''. Since the change-over lever 42 is in the left side position, the switch S7 is in the position to drive the motor M forward. By the change-over of the switch S8 as described above, the motor M starts to rotate in the forward direction and the sectors 30 and 31 are rotated and a film is fed in the camera. Since the fade gear 20 is not operated, the angle of the sectors is kept to be in the fully opened state. The fully opened state of the sectors is a normal state where the film exposure is conducted without fade-in or fade-out. When the normal operation of the motion picture is completed, the main switch S1 is opened and the relay R is deenergized accordingly. The movable contact S8' of the switch S8 is returned to the fixed contact S8''' to stop the motor and the solenoid S is energized when the switch 6 is instantly opened by the rotation of the sector drive shaft 31a with which the switch 6 is operatively connected and a sector position regulating mechanism (not shown) is operated to stop the sector at a predetermined position where the switch 6 is opened. By the deenergization of the solenoid S, the sector position regulating mechanism is also released.

In this case, since the fade gear 20 is in the clockwise rotated position, the indicator board 5 is in the position to make the index "F.O" appear through the window 7 by means of the lever 17 and indicates that the fade-out operation is possible.

Therefore, in order to conduct the fade-out operation, the fade dial 1 is turned counterclockwise to make the mark 2 thereof indicate the index "F.O". Then, the pin 4 is moved to the lower position and rotate the change-over lever 10 counterclockwise and make the gear 16 mesh with the fade gear 20.

When the main switch 1 is closed, the relay R is energized to change over the switch S8 to drive the motor M similarly to the aforesaid operation and the sectors 30 and 31 are rotated and the film is fed. In this case, however, the fade gear 20 is rotated counterclockwise by way of a gear 16 and the screw gears 27a and 27b are moved to the left to reduce the angle of the section of the sectors 30 and 31 by means of the slide plate 23 and the slide pin 26. Since the switch S2 is opened as the fade gear 20 carrying the contact member 20b rotates counterclockwise, the relay R is automatically deenergized when the sectors are closed even if the switch S1 is kept being closed and accordingly the motor M is deenergized and the sector is stopped at the predetermined position. Although the switch S3 is closed at this state, the switch S9 is still in the opened position and accordingly the circuit is still in the non-operating condition.

By the counterclockwise rotation of the fade gear 20, the indicator board 5 is rotated counterclockwise by way of the pin 19 and the lever 17 and the index "F.O" disappears and the index "F.I" appears through the window 8, which indicates that a fade-in operation is possible.

In the automatic fading operation, it is sometimes desired that the fade-in and fade-out be overlapped. In order to overlap the fade-in and fade-out, the film must be rewound by the length of the fade-out and the fade-in should be started thereafter. In order to rewind the film for the above purpose, the fade dial 1 is rotated to make it indicate the index "R". The pin 4 is moved to the right and pushes the arm 42c of the change-over plate 42 to the right overcoming the tension of the spring 43. By the rightward movement of the change-over plate 42, the switch S7 is switched to a rewind position and the stopper 41 moves the ratchet wheel 40 slightly in the counterclockwise direction and the switch S5 is closed by the contact member 40a. The change-over lever 10 is returned to its neutral position when the pin 4 is brought to the right side position and the gears 14 and 16 are separated from the fade gear 20. Upon closure of the switch S1, the relay R is energized by way of the switches S5 and S1 and the switch S8 is changed over to rotate the motor M in the rearward direction. During this operation, the gear 37 is rotated by way of the gears 11 and 36 to operate the feed claw 39 to advance the ratchet wheel 40. When the film is rewound by the length required, the switch S5 is opened by the rotation of the ratchet wheel 40 and the relay R is deenergized. Thus, the sectors 30 and 31 are brought to the predetermined positions and the motor M is stopped. Since the gears 14 and 16 are separated from the fade gear 20, the fade gear 20 is not rotated by the rotation of the motor M and accordingly the film is rewound with the sectors closed.

Then, in order to overlap the fade-in on the fade-out, the fade dial 1 is turned to the position to make the index "F.I" appear through the window 8. The pin 4 is moved to the upper position to rotate the change-over lever 10 clockwise and make the gear 14 mesh with the fade gear 20 and make the contact member 1a of the fade dial 1 fall into contact with the switch S4 to close the switch S4. By the movement of the pin 4, the change-over plate 42 is released and returned to the left by the tension of the spring 43. Thus, the switch S7 is returned to its forward drive position again. By the closure of the main switch S1, the relay R is energized by way of the switches S1 and S4 and the motor M is rotated in the forward direction and the fade gear 20 is rotated clockwise by means of the gear 14 to slide the slide plate 23 to the right and open the section of the sectors 30 and 31 from the closed position to the opened position, i.e., conducting a fade-in operation. When the film is advanced by the length required for the overlapping, the flat portion 20a of the fade gear 20 comes to the position of the gear 14 and the fade gear 20 is stopped at the position to fully open the sectors 30 and 31 even while the gear 14 is rotated. Further, the switch S2 is closed and the switch S3 is kept being opened. Therefore, while the main switch S1 is closed, a normal operation is continued after the overlapping operation. Upon opening the main switch S1, the motor M is deenergized and the whole operation of the motion picture camera is stopped. By the clockwise rotation of the fade gear 20, the indicator board 5 is again rotated to the position where the index "F.O" appears through the window 7 by way of the lever 17. At a proper occasion after the completion of the operation, the fade dial 1 is returned to the initial position where it indicates the index "N" to make it ready for the next operation.

When it is desired that a fade-in operation should be continued to the fade-out operation without overlapping operation, the aforesaid rewind operation is not conducted and the fade dial 1 is directly rotated to the position of the index "F.I" passing by the index "N".

In order to feed the film forward or rearward without performing the fading operation, the fade gear 20 is manually rotated counterclockwise to completely close the sectors 30 and 31 and the switch S2 is opened, the switch S3 is closed and, when the film is to be fed forward, the fade dial 1 is set at the position of the index "N", and when the film is to be fed rearward, the fade dial 1 is set at the position of the index "R". The pin 4 is accordingly moved to the right to move the change-over plate 42 to the right to put the switch S7 in the rearward drive position. Then, by closing the switch S9, the relay R is energized by way of the switches S3 and S9 to drive the motor M. Therefore, the film can be fed forward or rearward with the sectors closed while the switch S9 is closed.

I claim:

1. A fading device for a motion picture camera, comprising a pair of sectors rotated relatively to each other to vary the angle of a light passing section formed thereby for effecting the fade-in or fade-out, the sectors being rotated relatively to each other by means of a mechanism driven by a motor by way of a change-over means including a light passing angle varying member which is operable to change the direction of relative rotation of said sectors, a rotatable fade operating member operatively connected with said change-over means, an indicator board carrying a first index indicating that the fade-out is possible when the sectors are opened and a second index indicating that the fade-in is possible when the sectors are closed, a pair of windows which selectively make said indices appear therethrough, said indicator board and said windows being movable relatively to each other, and said fade operating member being associated with said windows, and means operatively connecting said indicator board with said light passing angle varying member to move said board to make the corresponding index appear indicating whether fade-out or fade-in is possible.

2. A fading device for a motion picture camera as claimed in claim 1, wherein said connecting means includes a lever mechanically connected with said indicator board and said light passing angle varying member.

3. A fading device for a motion picture camera as claimed in claim 1 wherein said member is a gear which is rotatable back and forth, the clockwise rotation of said gear causing the increase of said angle for effecting fade-in, the counterclockwise rotation of said gear causing the decrease of said angle for effecting fade-out.

* * * * *